(12) United States Patent
Wang et al.

(10) Patent No.: US 9,838,258 B2
(45) Date of Patent: Dec. 5, 2017

(54) NETWORK SERVICE INTERFACE FOR MACHINE-TO-MACHINE APPLICATIONS

(71) Applicant: AT&T Intellectual Property I, L.P., Atlanta, GA (US)

(72) Inventors: Jianrong Wang, Issaquah, WA (US); Farooq Bari, Kirkland, WA (US); David K. Smith, Issaquah, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 190 days.

(21) Appl. No.: 14/560,445

(22) Filed: Dec. 4, 2014

(65) Prior Publication Data

US 2016/0164730 A1  Jun. 9, 2016

(51) Int. Cl.
*G06F 15/177* (2006.01)
*H04L 12/24* (2006.01)
(Continued)

(52) U.S. Cl.
CPC ......... *H04L 41/0853* (2013.01); *H04W 4/005* (2013.01); *H04L 47/10* (2013.01); *H04W 4/02* (2013.01)

(58) Field of Classification Search
CPC . H04L 41/0816; H04L 41/0853; H04L 47/10; H04W 4/005; H04W 4/02
See application file for complete search history.

(56) References Cited

U.S. PATENT DOCUMENTS 7,774,008 B2   8/2010   Benaouda et al.
8,325,614 B2   12/2012  Poon et al.
(Continued)

FOREIGN PATENT DOCUMENTS

KR   20130068218 A   6/2013
WO   2012080414 A2   6/2012
(Continued)

OTHER PUBLICATIONS

US 8,861,440, 10/2014, Li (withdrawn)
(Continued)

*Primary Examiner* — Tonia L Dollinger
*Assistant Examiner* — Steven Nguyen
(74) *Attorney, Agent, or Firm* — Amin, Turocy & Watson, LLP

(57) ABSTRACT

Utilizing a network service interface function within a machine-to-machine common service layer is presented herein. A method can comprise determining network configuration information for network devices coupled to a set of distributed remote devices; receiving a device request directed to a remote device of the set of distributed remote devices; determining, based on the network configuration information, a network interface for facilitating performance of the device request; and sending, via the network interface, command information corresponding to the device request directed to the remote device. In an example, in response to determining that a traffic load of a communication channel associated with the remote device satisfies a defined condition with respect to an increased loading of such channel, the method can comprise sending a message to request delay of the device request if the device request has been determined to be a non-priority request.

20 Claims, 12 Drawing Sheets

(51) Int. Cl.
*H04W 4/00* (2009.01)
*H04L 12/801* (2013.01)
*H04W 4/02* (2009.01)

(56) References Cited

U.S. PATENT DOCUMENTS

| | | | |
|---|---|---|---|
| 8,782,195 B2 | 7/2014 | Foti | |
| 8,818,946 B2 | 8/2014 | Foti | |
| 2008/0005298 A1* | 1/2008 | Busalacchi | H04L 41/08 709/223 |
| 2008/0282182 A1* | 11/2008 | Oosaka | H04L 12/2803 715/772 |
| 2011/0196915 A1* | 8/2011 | Kim | H04L 12/2805 709/203 |
| 2011/0200052 A1 | 8/2011 | Mungo et al. | |
| 2011/0213871 A1* | 9/2011 | DiGirolamo | H04W 4/00 709/223 |
| 2012/0016942 A1 | 1/2012 | Cherian et al. | |
| 2012/0093008 A1* | 4/2012 | Diachina | H04L 43/0876 370/252 |
| 2012/0265983 A1 | 10/2012 | Yegin et al. | |
| 2012/0311142 A1 | 12/2012 | Stargardt et al. | |
| 2013/0016657 A1 | 1/2013 | Muhanna et al. | |
| 2013/0058209 A1 | 3/2013 | Zhu et al. | |
| 2013/0094444 A1 | 4/2013 | Lai et al. | |
| 2013/0188515 A1 | 7/2013 | Pinheiro et al. | |
| 2013/0212236 A1 | 8/2013 | Foti et al. | |
| 2013/0227036 A1 | 8/2013 | Kang et al. | |
| 2013/0294285 A1 | 11/2013 | Zhang et al. | |
| 2013/0329653 A1 | 12/2013 | Russell et al. | |
| 2013/0343231 A1 | 12/2013 | Foti | |
| 2014/0003339 A1 | 1/2014 | Jain et al. | |
| 2014/0089666 A1 | 3/2014 | Kim et al. | |
| 2014/0095728 A1 | 4/2014 | Zhu et al. | |
| 2014/0126581 A1 | 5/2014 | Wang et al. | |
| 2014/0129672 A1 | 5/2014 | Singh | |
| 2014/0189001 A1 | 7/2014 | Tyagi et al. | |
| 2014/0221032 A1 | 8/2014 | Yang | |
| 2014/0233473 A1 | 8/2014 | Lu et al. | |
| 2014/0242983 A1 | 8/2014 | Chang et al. | |
| 2014/0256285 A1 | 9/2014 | Koo | |
| 2014/0297806 A1 | 10/2014 | Hwang et al. | |

FOREIGN PATENT DOCUMENTS

| | | |
|---|---|---|
| WO | 2013032081 A1 | 3/2013 |
| WO | 2013106188 A2 | 7/2013 |
| WO | 2013142139 A2 | 9/2013 |
| WO | 2014117039 A1 | 7/2014 |

OTHER PUBLICATIONS

Tan, et al., "M2M Communications in The Smart Grid: Applications, Standards, Enabling Technologies, and Research Challenges," International Journal of Digital Multimedia Broadcasting, 2011, 9 Pages, vol. 2011, Hindawi Publishing Corporation, Retrieved on Oct. 21, 2014.

Atzori, et al., "The Internet of Things: A Survey," Computer Networks 54, 2010, pp. 2787-2805, Elsevier, Retrieved on Oct. 21, 2014.

Chen, et al., "Machine-to-Machine Communications: Architectures, Standards and Applications," KSII Transactions on Internet and Information Systems, Feb. 2012, pp. 480-497, vol. 6, No. 2, KSII, Retrieved on Oct. 21, 2014.

Wu, et al., "M2M: From Mobile to Embedded Internet," IEEE Communications Magazine, Apr. 2011, pp. 36-43, IEEE, Retrieved on Oct. 21, 2014.

Lien, et al., "Toward Ubiquitous Massive Accesses in 3GPP Machine-to-Machine Communications," IEEE Communications Magazine, Apr. 2011, pp. 66-74, IEEE, Retrieved on Oct. 21, 2014.

* cited by examiner

NETWORK SERVICE INTERFACE FOR MACHINE-TO-MACHINE APPLICATIONS

TECHNICAL FIELD

The subject disclosure generally relates to embodiments for a network service interface for machine-to-machine (M2M) applications.

BACKGROUND

Mobile network technologies enable access of network resources by M2M devices. However, such technologies have had some drawbacks with respect to providing visibility and control of M2M application traffic communicated via such resources, leaving much room for improvement.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
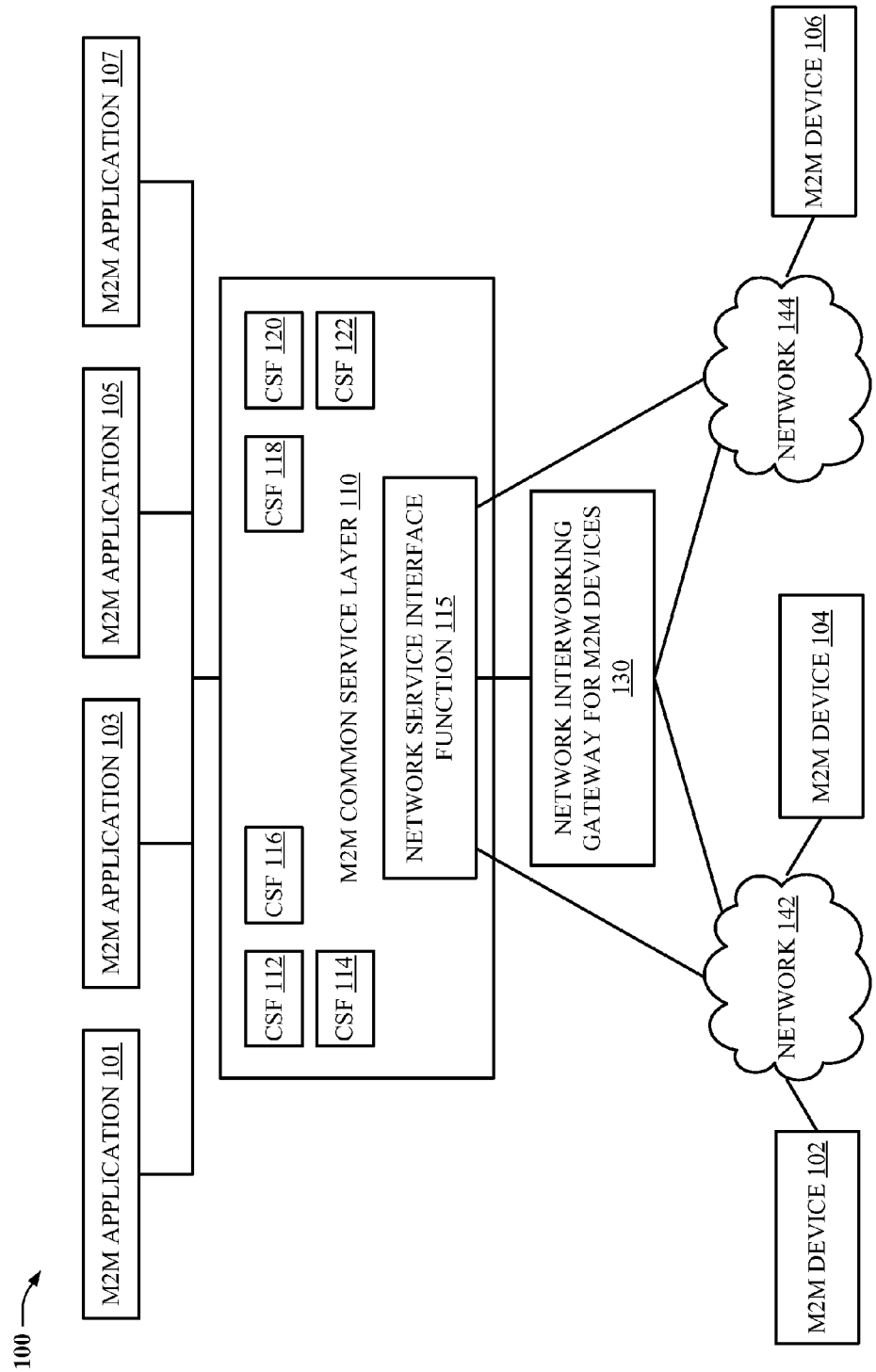
FIG. 1 illustrates a block diagram of an M2M network environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As mentioned, conventional mobile network technologies have had some drawbacks with respect to providing visibility and control of M2M application traffic communicated via mobile network resources. Various embodiments disclosed herein can provide network service providers an opportunity to optimize utilization of network resources for M2M applications and services by exposing network services to such applications and resources using a network service interface function (NSIF) within an M2M common service layer.

For example, a method can comprise determining, receiving, monitoring, etc., by a system comprising a processor, e.g., by an NSIF, network configuration information, e.g., provisioning information, pre-configuration information, etc. representing a type, technology, etc. of a network, network device(s), service(s) the network device(s) support, preferred interface(s), type(s) of the interface(s), etc. for the service(s) and/or network device(s), etc.—the network device(s) coupled, communicatively coupled, etc. to a set of distributed remote device(s), e.g., M2M based device(s) comprising sensor(s), meter(s), radio frequency identification (RFID) device(s), wireless device(s), wired device(s), home automation and/or security based device(s), power and/or energy control device(s), vehicle based control and/or monitoring device(s), health monitoring device(s), industrial control and/or monitoring devices(s), etc. within, e.g., an Internet of Things (IoT) computing environment.

In this regard, the IoT computing environment can comprise uniquely identifiable embedded computing devices, e.g., M2M based devices, within an Internet infrastructure. For example, the M2M based devices can be configured to exchange information and/or perform actions, e.g., remote monitoring, remote control, etc. based on M2M communications between the M2M based devices and M2M applications, e.g., automatically, controlling such devices.

In an embodiment, the determining, etc. of the network configuration information can comprise receiving the network configuration information via, from, etc. the network device(s), other device(s), etc. Further, the method can comprise storing the network configuration information in a storage device, data store, memory device, etc. of the NSIF, e.g., for later retrieval by the NSIF. For example, the method can retrieve portion(s) of the stored network configuration information, e.g., in response to receiving a request, an M2M communication, an M2M device communication, a command, a message, etc. from an M2M application—the request, etc. directed to a remote device of the set of remote device(s) for facilitating performance of an action by the remote device.

In this regard, the method can comprise receiving, by the system, e.g., via an application programming interface (API), the request, the M2M communication, the M2M device communication, the command, the message, etc. from the M2M application, e.g., of a requesting device, requesting that the remote device return information, data, status and/or state information of the remote device, requesting that the remote device be configured according to a defined configuration, e.g., requesting that the remote device transition from a first power, e.g., "sleep", state corresponding to reduced power consumption, to a second power, e.g., "wake up", state corresponding to an increased power consumption, requesting that the remote device to return, send, etc. location data representing a geographical position, location, etc. of the remote device, etc.

Further, the method can comprise determining, by the system based on the network configuration information, a network interface, e.g., network device, network communication protocol, etc. for facilitating performance of the device request, e.g., for sending and/or receiving M2M communications between a network device of a network that has been communicatively coupled to the remote device and the NSIF. In this regard, the method can comprise sending, by the system via the network interface, the request, the M2M communication, etc. directed to the remote device, e.g., for performance of the device request by the remote device.

In another embodiment, the method can comprise receiving, by the system, communication traffic information representing communication traffic conditions, loading, a traffic load, etc. corresponding to, e.g., wired and/or wireless, communication channel(s) of the network. Further, in response to determining that the traffic load of the communication channel(s) satisfies a defined condition with respect to an increased loading of the communication channel(s), the method can comprise determining whether the request, M2M communication, M2M device communication, command, message, etc. received from the M2M application, e.g., of the requesting device, is a non-priority communication request. In this regard, in response to determining that the request, etc. is a non-priority communication request, the method can comprise sending, by the system, a communication, message, etc. to the M2M application, e.g., of the requesting device, requesting such application to delay the non-priority communication request.

In yet another embodiment, in response to determining that the traffic load of the communication channel(s) satisfies the defined condition with respect to the increased loading of the communication channel(s), and in response to determining that the request, etc. is a priority communication request, the method can comprise sending, by the system, the priority communication request directed to the remote device.

In one or more embodiments, the network interface can comprise a third generation partnership project (3GPP) Tsp interface between the NSIF and a network interworking gateway (NIGW) for M2M devices that has been coupled to the network device, a network API corresponding to the NIGW for M2M devices, etc. In other embodiment(s), the network interface can comprise a direct or aggregated Internet protocol (IP) connection between the NSIF and the network device.

In one embodiment, a system comprising a processor, e.g., an NSIF, can comprise a network information component and a network interface component. The network information component can be configured to receive network configuration information of a network device of a network, communication network, etc. that has been coupled to a remote device, e.g., M2M based device, of a set of distributed remote devices, e.g., a set of distributed M2M based devices. The network configuration information can comprise provisioning information, pre-configuration information, etc. representing a type, technology, etc. of the network, the network device, service(s) the network device supports, preferred interface(s), type(s) of the interface(s), etc. for the service(s) and/or the network device, etc. In one embodiment, the network information component can comprise a storage component, e.g., storage device, medium, etc. for storage, retrieval, etc. of the network configuration information.

In another embodiment, the M2M based device can be configured to exchange information and/or perform action(s), e.g., remote monitoring, remote control, etc. based on an M2M communication, request, etc. received, via the NSIF, from an M2M application for facilitating performance of the action(s) by the M2M based device. In this regard, the network interface component can be configured to receive, from an M2M application via an API, the M2M communication, request, etc. to request performance of the action(s) by the remote device, e.g., the M2M application configured to automatically control operation of the M2M based device via M2M communications between the M2M based device and the M2M application.

Further, the network interface component can be configured to select, based on the network configuration information received, stored, etc. by the network information component, a network interface, e.g., a network device, a network communication protocol, etc. between the NSIF and the NIGW for M2M devices, between the NSIF and the network, etc., and send, via the network interface, the M2M communication, request, etc. to the M2M device for facilitating the performance of the action(s) by the remote device, e.g., the M2M communication, request, etc. directing the M2M device to send information representing a configuration of the M2M device, to send geographical information representing a geographical position, location, etc. of the M2M device, to send information obtained by the M2M device corresponding to the M2M application, etc. In one embodiment, the M2M communication, request, etc. can direct to M2M device to be configured according to a defined configuration, power state, etc.

In other embodiment(s), the network interface can comprise a 3GPP Tsp interface, a network API, etc. corresponding to the NIGW for M2M devices. In yet other embodiment(s), the network interface can comprise a direct or aggregated IP based connection between the NSIF and the network device of the network, etc.

One embodiment can comprise a computer-readable storage device having stored thereon executable instructions that, in response to execution, cause a device comprising a processor to perform operations, the operations comprising: receiving network configuration information, e.g., representing a network protocol, a communication protocol, a preferred communication interface, etc. of a network device of a network coupled to a set of distributed remote devices, e.g., a set of distributed M2M devices.

Further, the operations can comprise receiving, e.g., via an API, a device request, e.g., an M2M communication, etc., e.g., from an M2M application corresponding to a remote device, e.g., an M2M device of the set of distributed M2M devices e.g., the device request directed to the M2M device to request performance of an action by the M2M device; selecting, based on the network configuration information, a network interface, e.g., direct or aggregated IP connection, 3GPP Tsp interface, network API, etc. for facilitating the performance of the action by the M2M device; and sending, based on the network interface, request information, e.g., representing the M2M communication, directed to the M2M device to request the performance of the action by the M2M device.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "function", "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a network device, a gateway, a wireless communication device, etc., by receiving reports from such communication equipment, by receiving operator preferences, by receiving historical information, by receiving extrinsic information, etc. For example, support vector machines can be configured via a learning or training phase within a classifier construction and feature selection module. Thus, the classifier(s) can be used by an artificial intelligence system to automatically learn and perform a number of functions, e.g., performed by NSIF 115 (see below), comprising but not limited to receiving network configuration information of a network device coupled to a set of distributed remote devices; receiving a device request for facilitating performance of an action by a remote device of the set of distributed remote devices; selecting, based on the network configuration information, a network interface for facilitating the performance of the action by the remote device; and sending, based on the network interface, request information directed to the remote device for facilitating the performance of the action by the remote device.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

For example, the classifier(s) can be used by the artificial intelligence system, e.g., NSIF 115 (see below), to automatically receive, monitor, review, etc. network information, e.g., representing communication traffic conditions, load conditions, etc. of a network communication channel. Further, the classifier(s) can be used by the artificial intelligence system to automatically control, adjust, etc. delivery of M2M communications based on the network information.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Aspects, features, and/or advantages of the disclosed subject matter can be exploited in substantially any wired telecommunication technology and/or any wireless telecommunication or radio technology, e.g., Institute of Electrical and Electronics Engineers (IEEE) 802.XX technology, e.g., Wi-Fi, Bluetooth, etc; worldwide interoperability for microwave access (WiMAX); enhanced general packet radio service (GPRS); third generation partnership project (3GPP) long term evolution (LTE); third generation partnership project 2 (3GPP2); ultra mobile broadband (UMB); 3GPP universal mobile telecommunication system (UMTS); high speed packet access (HSPA); high speed downlink packet access (HSDPA); high speed uplink packet access (HSUPA); LTE advanced (LTE-A), global system for mobile communication (GSM), near field communication (NFC), Wibree, Wi-Fi Direct, etc.

Further, selections of a radio technology, or radio access technology, can comprise second generation (2G), third generation (3G), fourth generation (4G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, terms like "user equipment" (UE), "mobile station," "mobile subscriber station," "access terminal," "terminal", "handset," "appliance," "machine," "wireless communication device," "cellular phone," "personal digital assistant," "smartphone," "wireless device", and similar terminology refer to a wired and/or wireless device, or wired and/or wireless communication device, which is at least one of (1) utilized by a subscriber of a wired and/or wireless service, communication service, etc. to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., network 142, network 144, etc. corresponding to an M2M network environment (see e.g., 100), for systems, methods, and/or apparatus disclosed herein can comprise any communication network, e.g., mobile and/or wire line-based circuit-switched communication network, etc. comprising, e.g., a global systems for mobile communication (GSM) network, a time division multiple access (TDMA) network, a code division multiple access (CDMA) network, such as IS-95 and subsequent iterations of CDMA technology, an integrated digital enhanced network (iDEN) network, a public switched telephone network (PSTN), etc. Further, examples of the communication network can comprise any suitable data packet-switched or combination data packet/circuit-switched communication network, wired or wireless IP network such as a VoLTE network, a VoIP network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device, M2M device, etc. (see e.g., 102, 104, 106) for systems, methods, and/or apparatus disclosed herein can comprise a wireless device, a wired device, e.g., physically coupled to the communication network, a mobile device, a mobile phone, a 4G, etc. cellular communication device, a PSTN phone, a cellular communication device, a cellular phone, a satellite communication device, a satellite phone, a VoIP phone, Wi-Fi phone, a dual-mode cellular/Wi-Fi phone, a combination cellular/VoIP/Wi-Fi/WiMAX phone, a smartphone, a laptop device, a tablet device, a television device, a vehicle device, a home security system device, a portable computer, a wireless system, a sensor, or any suitable combination thereof. Specific examples of the communication device can comprise, but are not limited to, a cellular device, such as a GSM, TDMA, CDMA, IS-95 and/or iDEN phone, a cellular/Wi-Fi device, such as a dual-mode GSM, TDMA, IS-95 and/or iDEN/VoIP phones, UMTS phones, UMTS VoIP phones, a Wibree based device, or like devices or combinations thereof.

To provide support for NSIF 115, the communication network, e.g., network 142, 144, etc. can comprise a gateway routing component (not shown) that can comprise any suitable component that can perform centralized routing within a mobile, satellite, or similar network (but optionally need not include components that route strictly within a PSTN network), routing between communication networks, between networks of varying architecture (e.g., between PSTN, GSM, UMTS), Enterprise VoIP, the Internet, or combinations thereof), and the like. Specific examples of a gateway routing component can comprise, but are not limited to, a gateway mobile switching center (GMSC), a gateway general packet radio service (GPRS) support node (GGSN), a session border control (SBC) device, or like devices. Additionally, a data storage component of such system(s), device(s), etc. can comprise any suitable device, process, and/or combination device that can store digital and/or switched information (e.g., server, data store component, or the like).

Conventional mobile network technologies have had some drawbacks with respect to providing visibility and control of M2M application traffic communicated via mobile network resources. On the other hand, various embodiments disclosed herein can optimize utilization of such resources for M2M applications by exposing mobile network services to the M2M applications. In this regard, and now referring to FIGS. 1 to 4, NSIF 115 can optimize use of available mobile network resources coupled to M2M devices by managing M2M communications between M2M applications and an NIGW for the M2M devices.

Now referring to FIGS. 1-4, M2M network environment 100 and variations of NSIF 115 are illustrated, respectively, in accordance with various embodiments. As illustrated by FIG. 1, NSIF 115 can be included in M2M common service layer 110, e.g., associated with a one M2M standard for M2M communications and IoT technology. In this regard, M2M common service layer 110 can comprise a set of common service functions, e.g., common service function (CSF) 112, 114, 116, 118, 120, 122, etc. that can be exposed to other entities via reference points, e.g., Mcc, Mcn, Mca, Mcc', etc. per the one M2M standard. For example, M2M common service layer 110 can represent a conceptual layer within a network service provider architecture that provides software applications, e.g., the set of common service functions, for performing communication and/or input/output operations between functions, components, computing devices, etc. within M2M network environment 100, e.g., as requested by M2M application 101, 103, 105, 107, etc.

In various aspects, NSIF 115 and/or NIGW for M2M devices 130 can be coupled to network 142, 144, etc. via a wired and/or wireless interface (not shown). The wireless interface can be an over-the-air wireless link comprising a downlink (DL) and an uplink (UL) (both not shown) that can utilize a predetermined band of radio frequency (RF) spectrum associated with, e.g., cellular, LTE, LTE-A, GSM, 3GPP UMTS, Wi-Fi, WiMax, Wibree, wireless local area networks (WLAN), Femto, etc. Accordingly, network 142, 144, etc. can be associated with such predetermined RF spectrum.

Network 142, 144, etc. can comprise software and/or hardware configured to provide connectivity between an M2M device (102, 104, 106) and NIGW for M2M devices 130, NSIF 115, etc. In this regard, network 142, 144, etc. can comprise one or more: macro, Femto, or pico access points (APs) (not shown); base stations (BS) (not shown); landline networks (e.g., optical landline networks, electrical landline networks) (not shown) communicatively coupled between the M2M device and NIGW for M2M devices 130, NSIF 115, etc. In various embodiments, NIGW for M2M devices 130 can communicate with network 142, 144, etc. via any number of various types of wireless technologies comprising, but not limited to, cellular, Wi-Fi, WiMax, wireless local area networks (WLAN), Femto, Wibree, etc. In corresponding embodiments, network 142, 144, etc. can provide cellular, Wi-Fi, WiMAX, WLAN, Wibree, and/or other technologies for facilitating such communication. Further, network 142, 144, etc. can comprise one or more of the Internet (or another communication network (e.g., IP-based network)), or a digital subscriber line (DSL)-type or broadband network facilitated by Ethernet or other technology.

Figure 2:
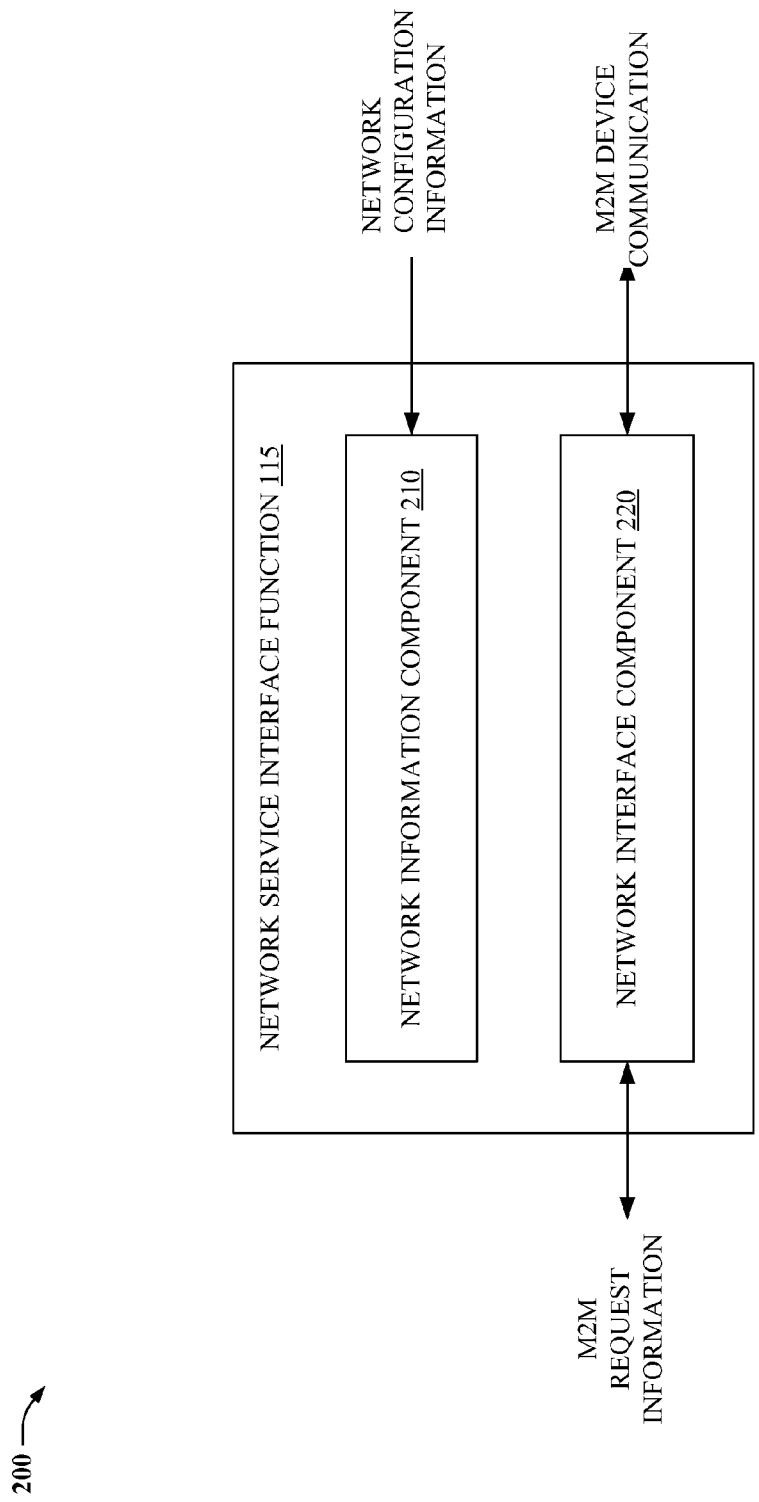
FIG. 2 illustrates a block diagram of a network service interface function, in accordance with various embodiments.

As illustrated by FIG. 2, NSIF 115 can comprise network information component 210 and network interface component 220. Network information component 210 can receive, monitor, etc. network configuration information of a network device, e.g., GW, etc. of network 142, 144, etc. The network configuration information can comprise provisioning information, pre-configuration information, etc. representing a type, technology, etc. of the network, the network device, service(s) the network device supports, preferred interface(s), type(s) of the interface(s), etc. for the service(s) and/or the network device, etc. In one embodiment illustrated by FIG. 3, network information component 210 can comprise storage component 310, e.g., a storage device, a storage medium, etc. that can be configured to store the network configuration information for later retrieval by network interface component 220.

Referring now to FIG. 1, network device(s) (not shown) of network 143, 144, etc. can be coupled, communicatively coupled, etc. to a set of distributed remote device(s), e.g., M2M device 102, 104, 106, etc. An M2M device (102, 104, 106) can comprise sensor(s), meter(s), RFID device(s), a wired device, a wireless device, a home automation and/or security based device, a power and/or energy control device, a vehicle based control and/or monitor device, a health monitor device, an industrial control and/or monitor device, etc. configured, e.g., within an IoT computing environment, as a uniquely identifiable embedded computing device, e.g., assigned a unique IP address. The M2M device can be configured to exchange information and/or perform actions, e.g., remote monitoring, remote control, etc. based on M2M communications transferred between an M2M application (101, 103, 105, 107) and the M2M device utilizing NSIF 115.

In this regard, network interface component 220 can be configured to receive, from the M2M application via an API, an M2M device communication, e.g. M2M request information, and select, based on the network configuration information, a network interface, e.g., a communication protocol between NSIF 115 and NIGW for M2M devices 130, between NSIF 115 and the network device(s) of network 142, 144, etc. for facilitating performance of an action by the M2M device. In embodiment(s), the network interface communicatively couples NSIF 115 to NIGW for M2M devices 130 and comprises a 3GPP Tsp interface, a network API, etc. In this regard, the network API can comprise an API defined by Open Mobile Alliance (OMA), Group Speciale Mobile Association (GSMA), other standards development organizations (SDOs), etc. and/or proprietary APIs, etc. In another embodiment, the network interface communicatively couples NSIF 115 to the network device(s) of network 142, 144, etc. utilizing a direct or aggregated IP based connection.

Further, network interface component 220 can send, using the selected network interface, the M2M device communication to the M2M device to request performance of the action by the M2M device. In one or more embodiments, the action can comprise: configuring the M2M device according to a defined configuration, power state, etc.; requesting the M2M device to return, send, etc. information, e.g., a state, a status, a geographical position, location, etc., measured data, etc. from the M2M device to the M2M application, etc. For example, the M2M device communication can comprise a request for the M2M device to transition from a first power state—corresponding to reduced power consumption—to a second power state corresponding to an increased power consumption, e.g., to wake up the M2M device from a sleep mode. In another example, the M2M communication can comprise a request for the M2M device to return, send, etc. location data representing a geographical position, location, etc. of the M2M device, etc.

Figure 3:
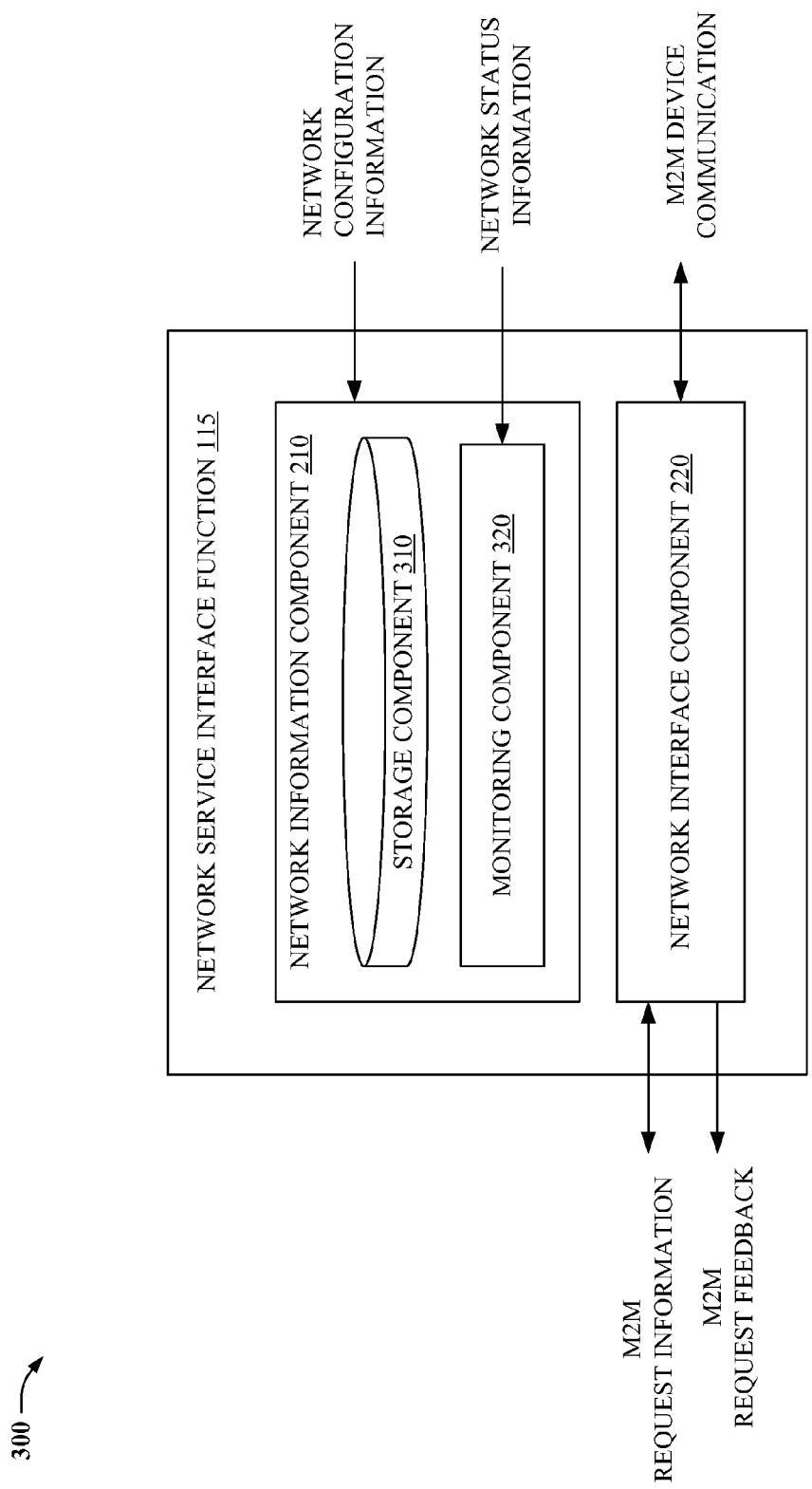
FIG. 3 illustrates a block diagram of another network service interface function, in accordance with various embodiments.

Referring now to FIG. 3, network information component 210 can comprise monitoring component 320, which can be configured to receive, monitor, review, etc. network information, e.g., in real-time, e.g., apart from handling M2M communications, requests, etc. received from M2M applications (101, 103, 105, 107). The network information can represent communication traffic conditions, load conditions, e.g., peak load periods, non-peak load periods, idle load periods, etc. corresponding to wired and/or wireless communication channels of network 142, 144, etc. In this regard, network interface component 220 can utilize the network information to dynamically adjust, in real-time, delivery of the M2M communication based on a determined communication traffic loading of network 142, 144, etc.

For example, in response to determining that the M2M communication corresponds to a non-priority request, and in response to determining that the communication traffic loading of network 142, 144, etc. satisfies a defined condition with respect to peak, congested, etc. loading of a communication channel of network 142,144, etc., network interface component 220 can send a communication, e.g., M2M request feedback, to the M2M application corresponding to the M2M request, notifying the M2M application to resend the M2M request at another time, e.g., corresponding to non-peak, non-congested, idle, etc. communication traffic loading of the communication channel, e.g., the other time determined by network interface component 220. In another example, in response to determining that the M2M communication corresponds to a priority request, and in response to determining that the communication traffic loading of network 142, 144, etc. satisfies the defined condition with respect to peak, congested, etc. loading of the communication channel, network interface component 220 can send, using the selected network interface, the priority communication to the M2M device to request performance of the action by the M2M device In another embodiment, network interface component 220 can be configured to send an acknowledgement communication, e.g., M2M request feedback, to the M2M application corresponding to the M2M request, notifying the M2M application whether the M2M request was successful. For example, in response to the sending of the M2M device communication to the M2M device for facilitating the performance of the action, network interface component 220 can receive, from the M2M device, a response, e.g., included in a response M2M device communication, representing whether the M2M request, action, etc. was performed successfully. In this regard, the acknowledgement communication can comprise the response received from the M2M device.

Figure 4:
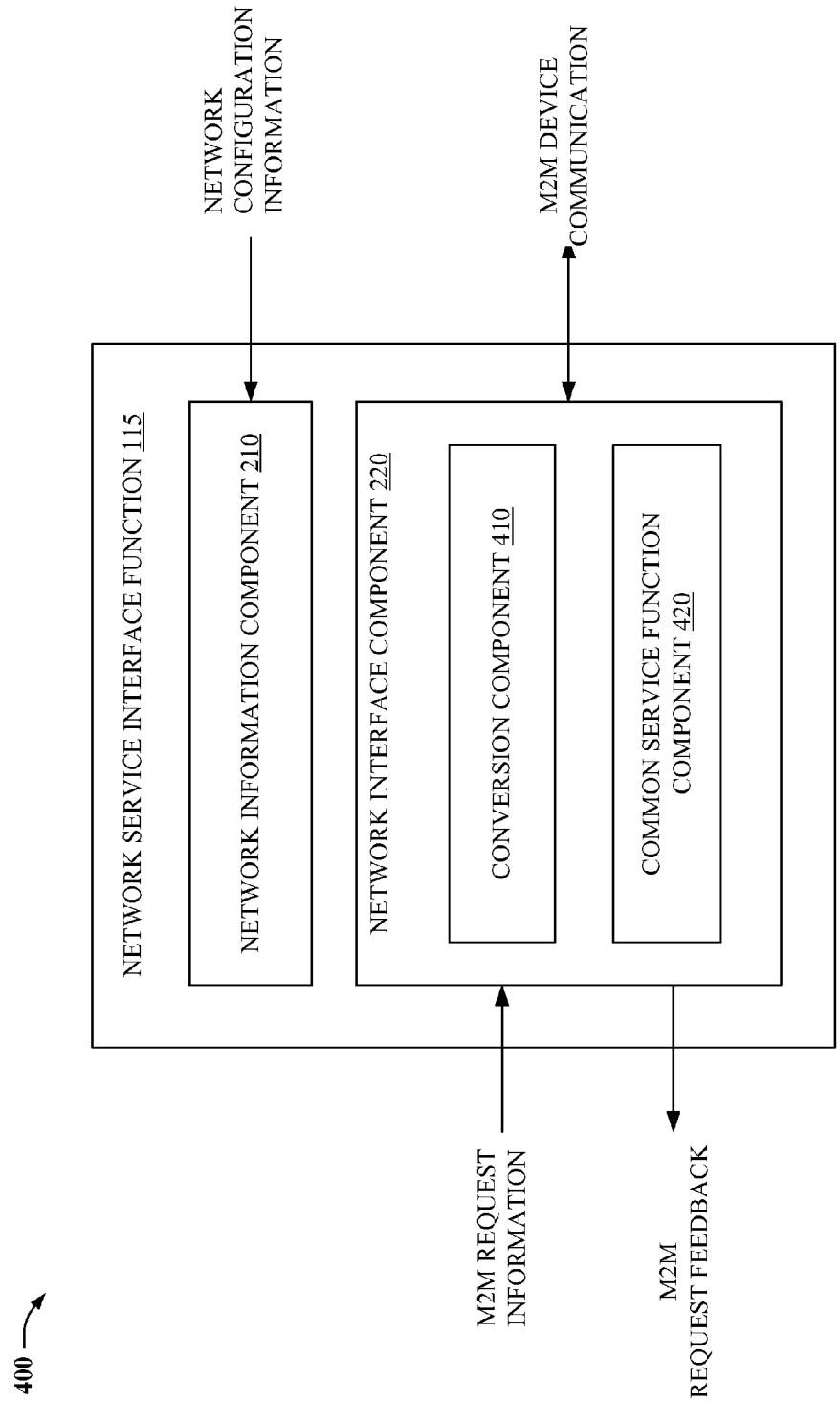
FIG. 4 illustrates a block diagram of yet another network service interface function, in accordance with various embodiments.
Figure 5:
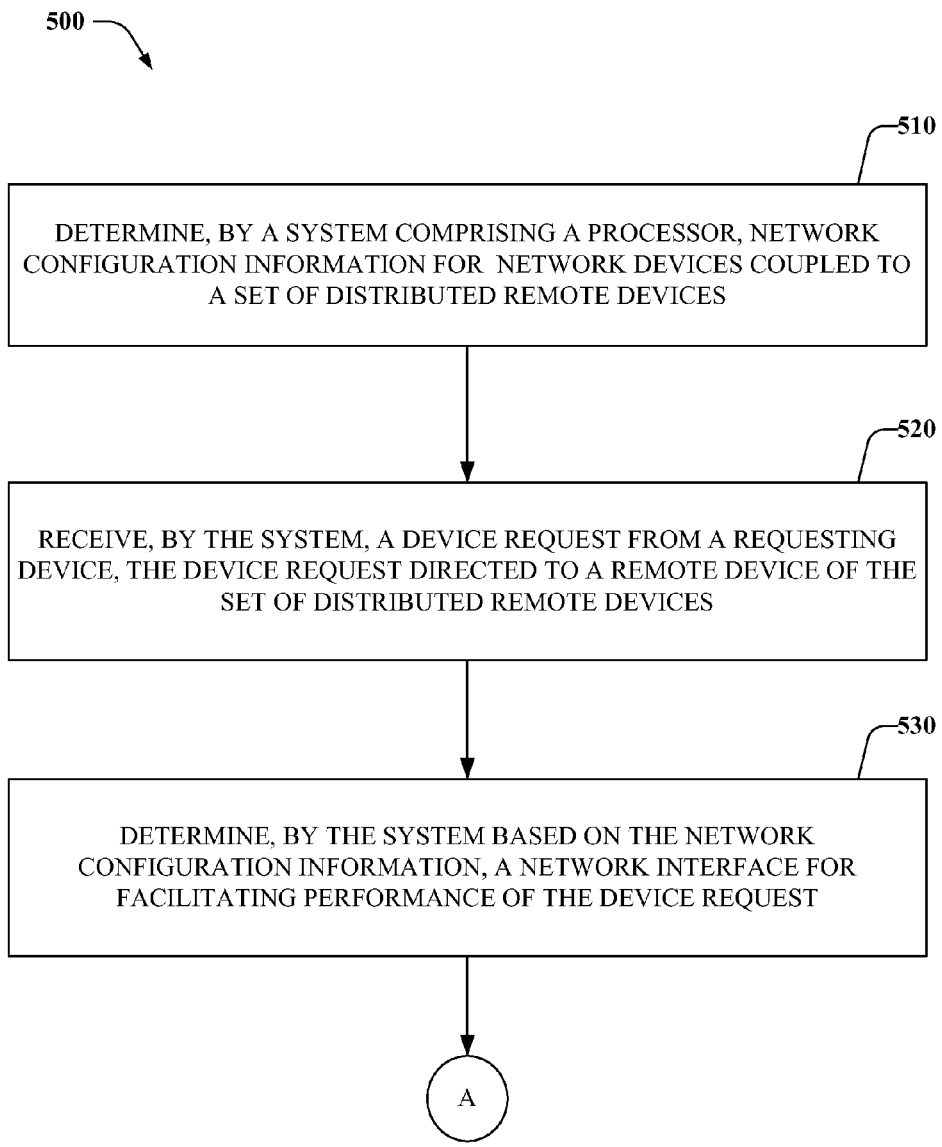
FIGS. 5-10 illustrate flowcharts of methods associated with a network service interface function, in accordance with various embodiments.
Figure 6:
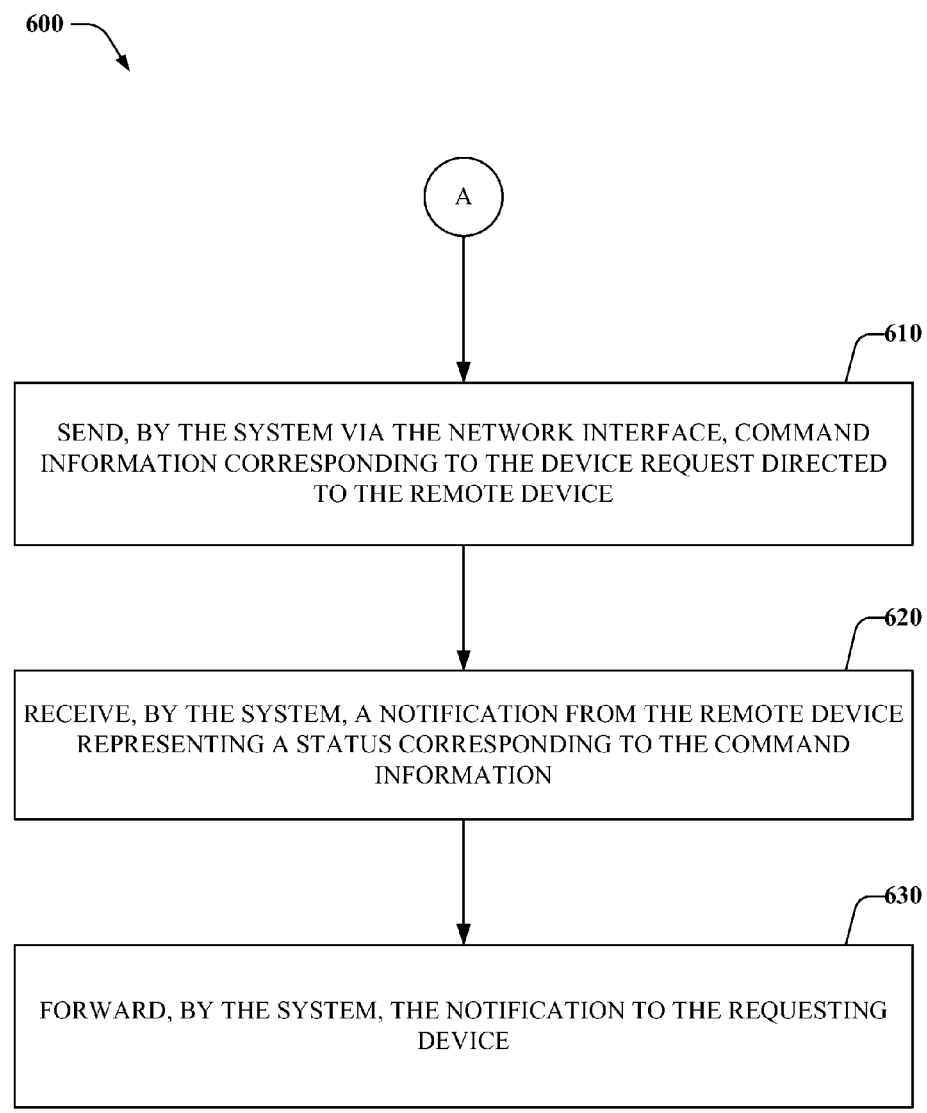

Now referring to FIG. 4, in an embodiment, network interface component 220 can comprise conversion component 410 and common service function (CSF) component 420. Conversion component 410 can be configured to receive an M2M request included in the M2M request information, and based on the network configuration information, convert a requested network communication protocol specified by the M2M request to a supported communication protocol, e.g., determined by network interface component 220 to be available based on the network configuration information. In one embodiment, in response to determining that the M2M request cannot be supported, network service component 220 can send M2M request feedback to an M2M application corresponding to the M2M request, notifying the M2M application that the request cannot be performed.

CSF component 420 can be configured to interface with a CSF (112, 114, 116, 118, 120, 122, etc.), e.g., receiving the M2M request information from the CSF. In this regard, the CSF can comprise a software application that can generate an M2M request directed to an M2M device for facilitating performance of an M2M action, e.g., configuring the M2M device according to a defined configuration, power state, etc.; requesting the M2M device to return, send, etc. information, e.g., a state, a status, a geographical position, location, etc., measured data, etc. from the M2M device to the M2M application, etc. Further, as described above, network interface component 220 can send, using a selected network interface, an M2M device communication to the M2M device for facilitating the performance of the M2M action. Furthermore, CSF component 420 can be configured to send M2M request feedback to the CSF, e.g., notifying the CSF whether the M2M request was successfully communicated, whether the M2M request can be performed, whether the M2M device acknowledged successful performance of the M2M action, etc.

In another embodiment, CSF component 420 can receive traffic control information from the CSF—the traffic control information representing communication traffic conditions, e.g., which have been determined, received, etc. by the CSF, of network(s) communicatively coupled to the set of distributed remote devices. In this regard, CSF component 420 can be configured to reschedule, re-route, etc. sending of the M2M device communication to the M2M device, e.g., selecting an optimal schedule and/or network protocol for facilitating performance of the action, based on the traffic control information.

FIGS. 5-9 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIGS. 5-9, processes 500 to 900 performed by NSIF 115 are illustrated, in accordance with various embodiments. In an embodiment illustrated by FIGS. 5 and 6, at 510, network configuration information for network devices coupled to a set of distributed remote devices can be determined, received, etc. by NSIF 115. At 520, a device request from a requesting device, e.g., corresponding to an application, CSF, etc. can be received by NSIF 115—the device request directed to a remote device of the set of distributed remote devices, the remote device communicatively coupled to a network device of a network. At 530, a network interface for facilitating performance of the device request can be determined, by NSIF 115, based on the network configuration information, At 610, command information, e.g., an M2M request, etc. corresponding to the device request, comprising the device request, etc. can be sent, by NSIF 115 via the network interface, directed to the remote device. In an embodiment, the command information, M2M request, etc. can be sent, via the network interface, e.g., utilizing 3GPP Tsp, a network API, etc. to NIGW for M2M devices 130. In another embodiment, the command information, M2M request, etc. can be sent, via a direct or aggregated IP connection, to the network device of the network. In an embodiment, the command information can be generated, by NSIF 115, based on a protocol, network protocol, etc. corresponding to the network interface. In this regard, the command information can comprise the device request, e.g., the M2M request, etc.

At 620, a notification, acknowledgement, etc. can be received by NSIF 115 from the remote device—the notification, acknowledgement, etc. representing a status corresponding to the command information, e.g., representing whether the remote device performed the M2M request. At 630, NSIF 115 can forward the notification to the requesting device, e.g., corresponding to the application, CSF, etc.

Figure 7:
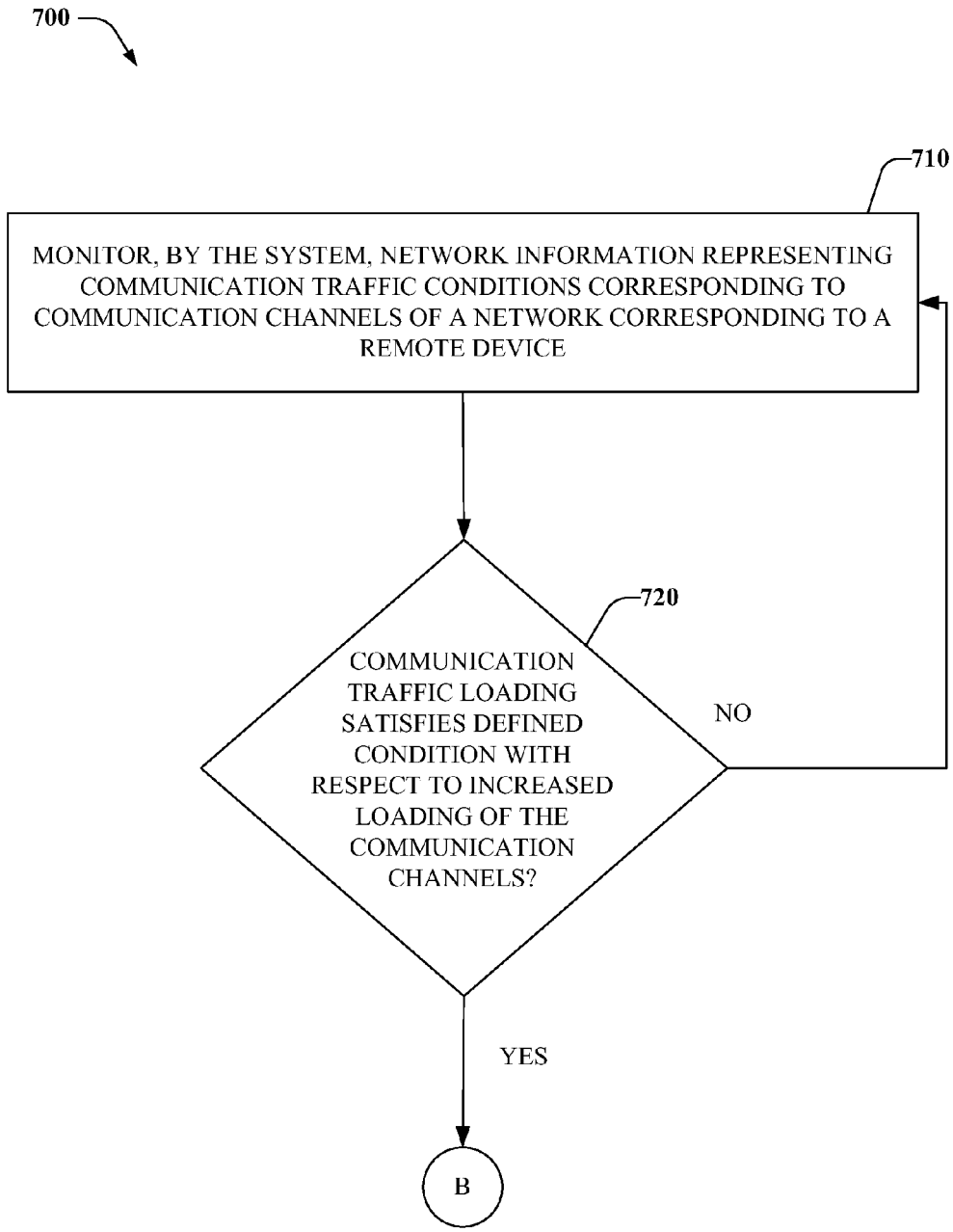
Figure 8:
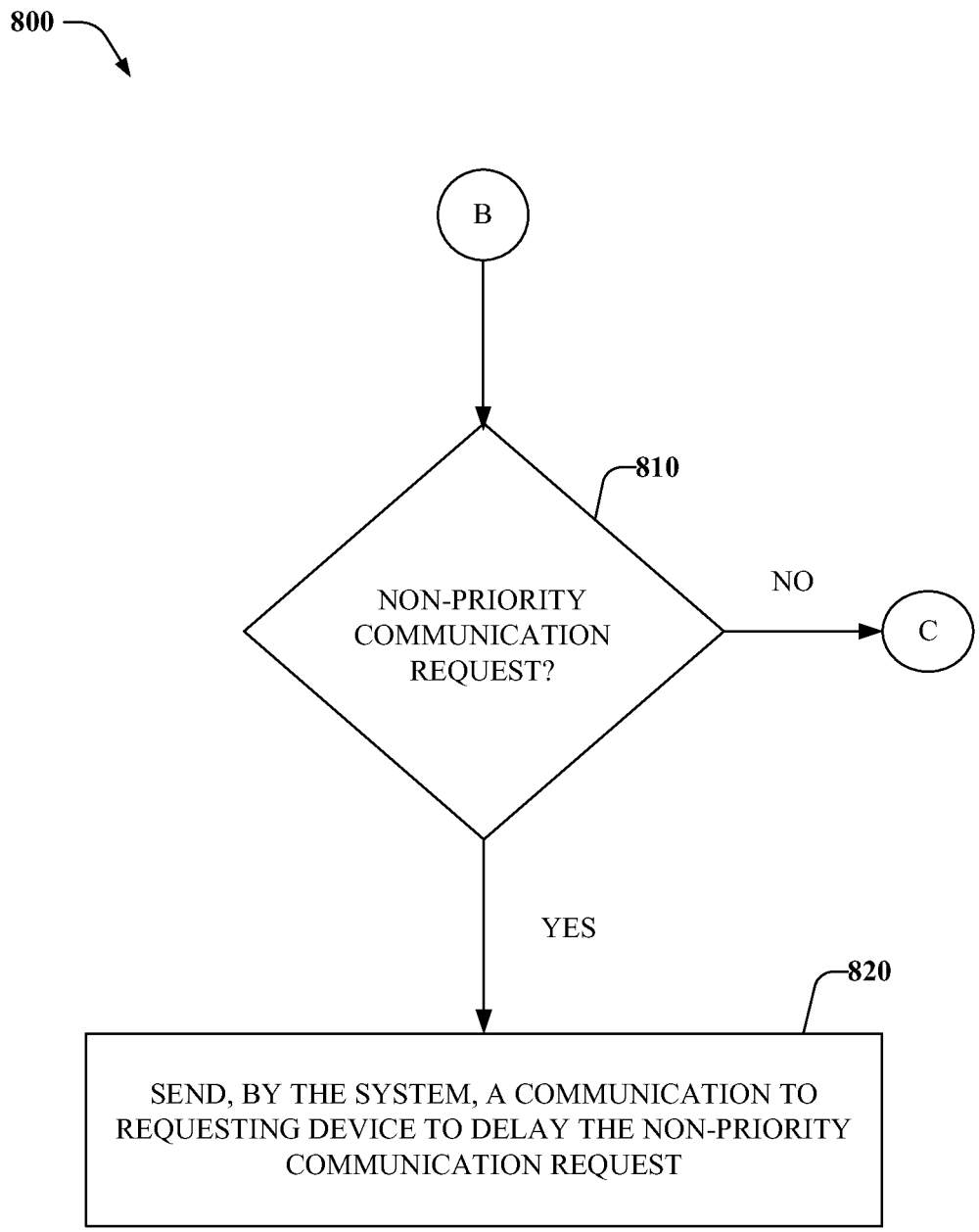
Figure 9:
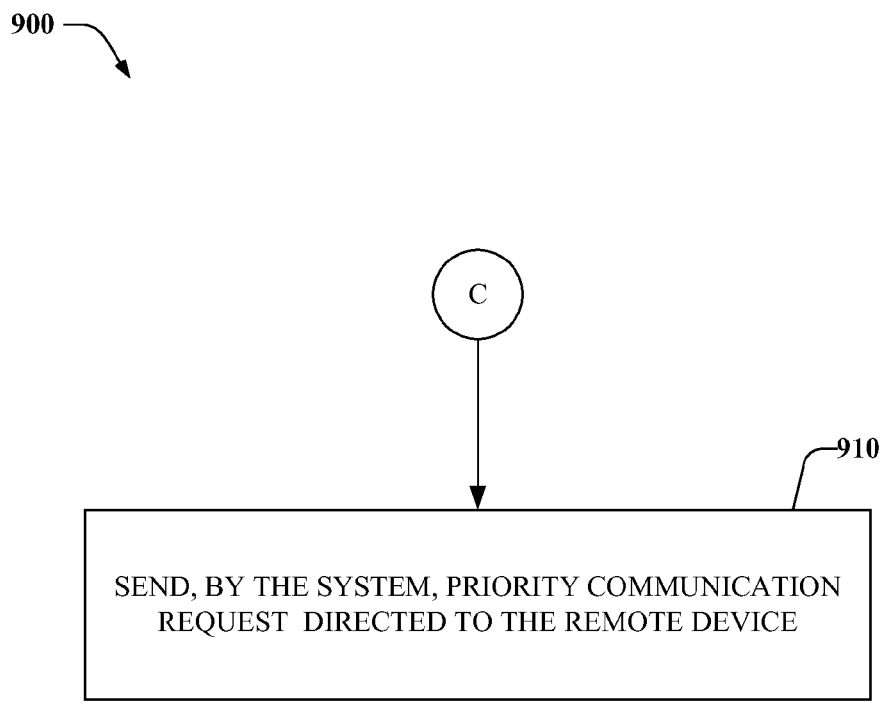

In embodiment(s) illustrated by FIGS. 7-9, at 710, network information, communication traffic information, etc. representing communication traffic conditions, loading, a traffic load, etc. corresponding to, e.g., wired and/or wireless, communication channel(s) of a network associated with a remote device can be monitored, received, etc. by NSIF 115. At 720, NSIF 115 can determine, based on the network information, whether the traffic load of the communication channel(s) satisfies a defined condition with respect to an increased loading of the communication channel(s).

In this regard, if it is determined, at 720, that the traffic load of the communication channel(s) satisfies the defined condition, flow continues to 810, at which NSIF 115 can determine whether a communication request received from a requesting device, e.g., corresponding to an application, CSF, etc. is a non-priority communication request; otherwise flow returns to 710. If it is determined, at 810, that the communication request is a non-priority communication request, flow continues to 820, at which NSIF 115 can send a communication, message, etc. to the requesting device, application, etc. requesting such device, application, etc. to delay the device request, non-priority communication request, etc.; otherwise flow continues to 910, at which the communication request, priority communication request, etc. can be sent, by NSIF 115 via the network interface, directed to the remote device.

Figure 10:
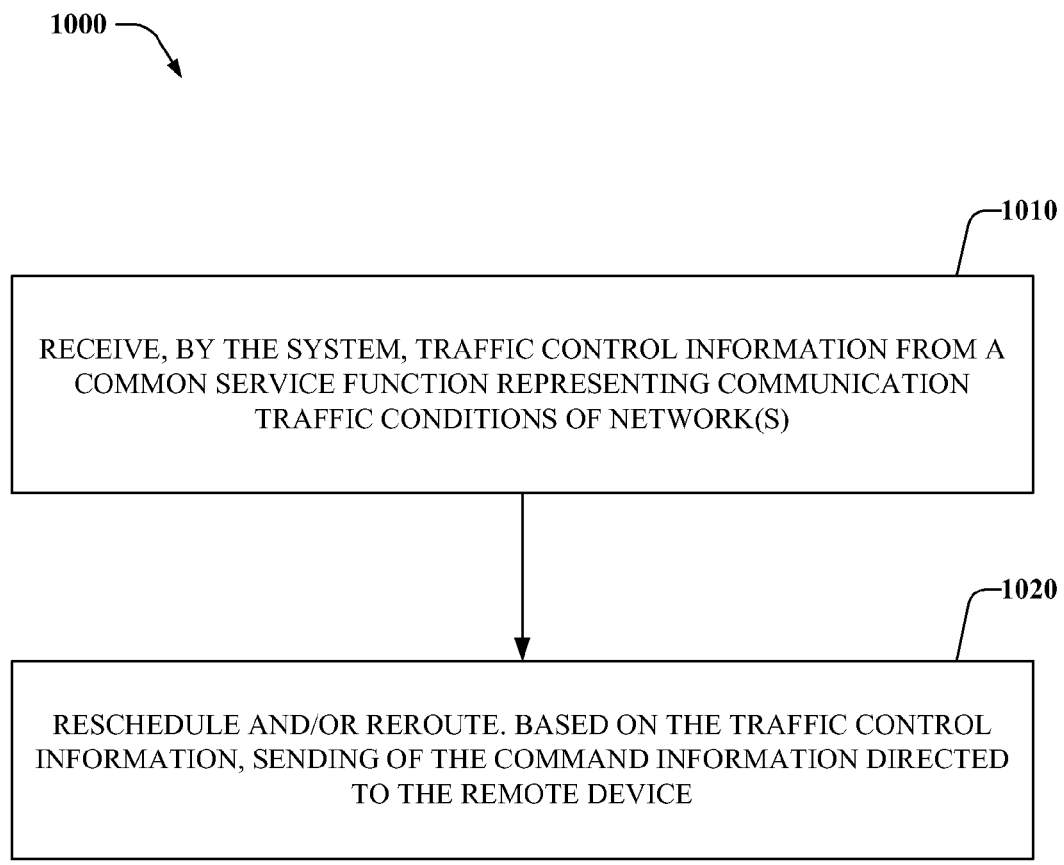

Referring now to an embodiment illustrated by FIG. 10, at 1010, NSIF 115 can receive traffic control information form a CSF—the traffic control information representing communication traffic condition(s) of network(s) communicatively coupled to remote device(s). In this regard, at 1020, NSIF 115 can reschedule and/or reroute, based on the traffic control information, the sending of the command information directed to the remote device.

Figure 11:
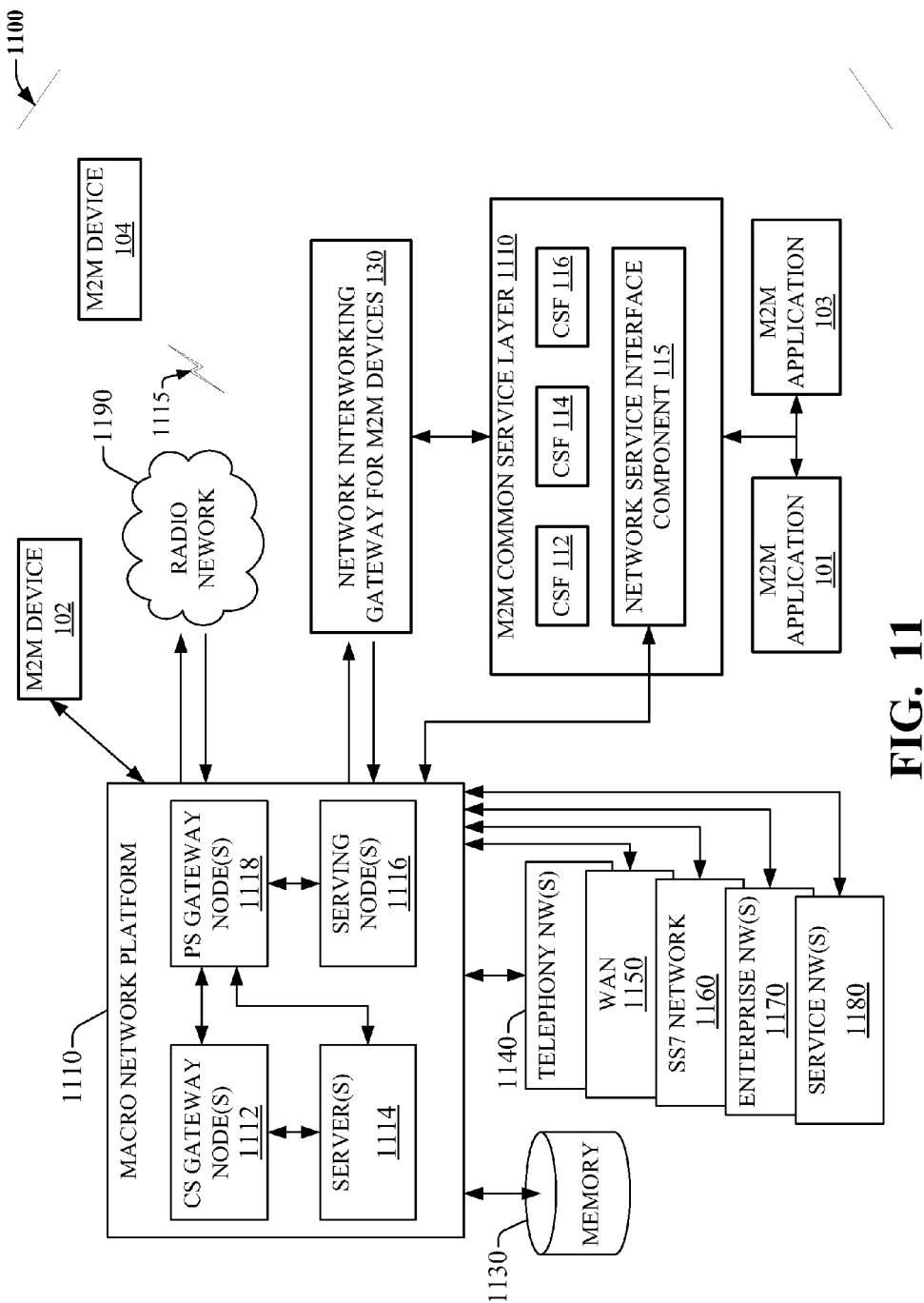
FIG. 11 illustrates a block diagram of a network environment, in accordance various embodiments.

With respect to FIG. 11, a wireless communication environment 1100 comprising macro network platform 1110 is illustrated, in accordance with various embodiments. Macro network platform 1110 serves or facilitates communication with a wired device, e.g., M2M device 102, and a wireless device, e.g., M2M device 104. In this regard, macro network platform 1110 serves or facilitates communication with the wireless device via radio network 1190. It should be appreciated that in cellular wireless technologies, e.g., 3GPP UMTS, HSPA, 3GPP LTE, 3GPP2 UMB, LTE-A, etc. that can be associated with radio network 1190, macro network platform 1110 can be embodied in a core network, e.g., network 142, 144, etc. It is noted that radio network 1190 can comprise base station(s), base transceiver station(s), access point(s), etc. and associated electronic circuitry and deployment site(s), in addition to a wireless radio link operated in accordance with the base station(s), etc. Accordingly, radio network 1190 can comprise various coverage cells, or wireless coverage areas.

Generally, macro network platform 1110 comprises components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication. In various embodiments, macro network platform 1110 comprises CS GW node(s) 1112 that can interface CS traffic received from legacy networks like telephony network(s) 1140, e.g., public switched telephone network (PSTN), public land mobile network (PLMN), Signalling System No. 7 (SS7) network 1160, etc. CS GW node(s) 1112 can authorize and authenticate traffic, e.g., voice, arising from such networks. Additionally, CS GW node(s) 1112 can access mobility or roaming data generated through SS7 network 1160; for instance, mobility data stored in a visitor location register (VLR), which can reside in memory 1130. Moreover, CS GW node(s) 1112 interfaces CS-based traffic and signaling with PS GW node(s) 1118. As an example, in a 3GPP UMTS network, PS GW node(s) 1118 can be embodied in GW GPRS support node(s) (GGSN).

As illustrated by FIG. 11, PS GW node(s) 1118 can receive and process CS-switched traffic and signaling via CS GW node(s) 1112. Further PS GW node(s) 1118 can authorize and authenticate PS-based data sessions with served, e.g., via radio network 1190, wireless devices, e.g., 114. Such data sessions can comprise traffic exchange with networks external to the macro network platform 1110, like wide area network(s) (WANs) 1150; enterprise networks (NWs) 1170, e.g., E911, service NW(s) 1180, e.g., an IP multimedia subsystem (IMS), etc. It should be appreciated that local area network(s) (LANs), which may be a part of enterprise NW(s) 1170, can also be interfaced with macro network platform 1110 through PS GW node(s) 1118. PS GW node(s) 1118 can generate packet data contexts when a data session is established, e.g., associated with an EPS bearer context activation. To that end, in an aspect, PS GW node(s) 1118 can comprise a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can comprise multiple flows that can be generated through server(s) 1114. It is to be noted that in 3GPP UMTS network(s), PS GW node(s) 1118 (e.g., GGSN) and tunnel interface (e.g., TTG) comprise a packet data GW (PDG).

Macro network platform 1110 also comprises serving node(s) 1116 that can convey the various packetized flows of information, or data streams, received through PS GW node(s) 1118. As an example, in a 3GPP UMTS network, serving node(s) can be embodied in serving GPRS support node(s) (SGSN).

As indicated above, server(s) 1114 in macro network platform 1110 can execute numerous applications, e.g., messaging, location services, wireless device management, etc. that can generate multiple disparate packetized data streams or flows; and can manage such flows, e.g., schedule, queue, format. Such application(s), for example can comprise add-on features to standard services provided by macro network platform 1110. Data streams can be conveyed to PS GW node(s) 1118 for authorization/authentication and initiation of a data session, and to serving node(s) 1116 for communication thereafter. Server(s) 1114 can also effect security, e.g., implement one or more firewalls, of macro network platform 1110 to ensure network's operation and data integrity in addition to authorization and authentication procedures that CS GW node(s) 1112 and PS GW node(s) 1118 can enact. Moreover, server(s) 1114 can provision services from external network(s), e.g., WAN 1150, or global positioning system (GPS) network(s), which can be a part of enterprise NW(s) 1180. It is to be noted that server(s) 1114 can comprise one or more processors configured to confer at least in part the functionality of macro network platform 1110. To that end, the one or more processors can execute code instructions stored in memory 1130, for example.

In wireless communication environment 1100, memory 1130 can store information related to operation of macro network platform 1110, e.g., related to operation of NSIF 115. The information can comprise business data associated with subscribers; market plans and strategies, e.g., promotional campaigns, business partnerships, mobile devices served through macro network platform, etc.; service and privacy policies; end-user service logs for law enforcement; term(s) and/or condition(s) associated with wireless service(s) provided via radio network 1190; and so forth. Memory 1130 can also store information from at least one of telephony network(s) 1140, WAN 1150, SS7 network 1160, enterprise NW(s) 1170, or service NW(s) 1180.

In one or more embodiments, components of core network environment 1100 can provide communication services to wireless devices, e.g., 104, via radio network 1190 utilizing over-the-air wireless link 1115. In this regard, radio network 1190 can comprise one or more: macro, Femto, or pico access points (APs) (not shown); base stations (BS) (not shown); landline networks (e.g., optical landline networks, electrical landline networks) (not shown) communicatively coupled between wireless devices, e.g., 104, and macro network platform 1110. Further, over-the-air wireless link 1115 can comprise a downlink (DL) and an uplink (UL) (both not shown) that can utilize a predetermined band of radio frequency (RF) spectrum associated with any number of various types of wireless technologies comprising, but not limited to, cellular, LTE, LTE-A, GSM, 3GPP UMTS, Wi-Fi, WiMax, wireless local area networks (WLAN), Femto, etc.

Core network environment 1100 can comprise one or more of the Internet (or another communication network (e.g., IP-based network)), or a digital subscriber line (DSL)-type or broadband network facilitated by Ethernet or other technology. In various embodiments, core network environment 1100 can comprise hardware and/or software for allocating resources to the wired (102) and/or wireless (104) device, converting or enforcing protocols, establishing and/or providing levels of quality of service (QoS), providing applications or services, translating signals, and/or performing other desired functions to facilitate system interoperability and communication to/from the wired (102) and/or wireless (104) device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in non-volatile memory 1222 (see below), disk storage 1224 (see below), and/or memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory 1220 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
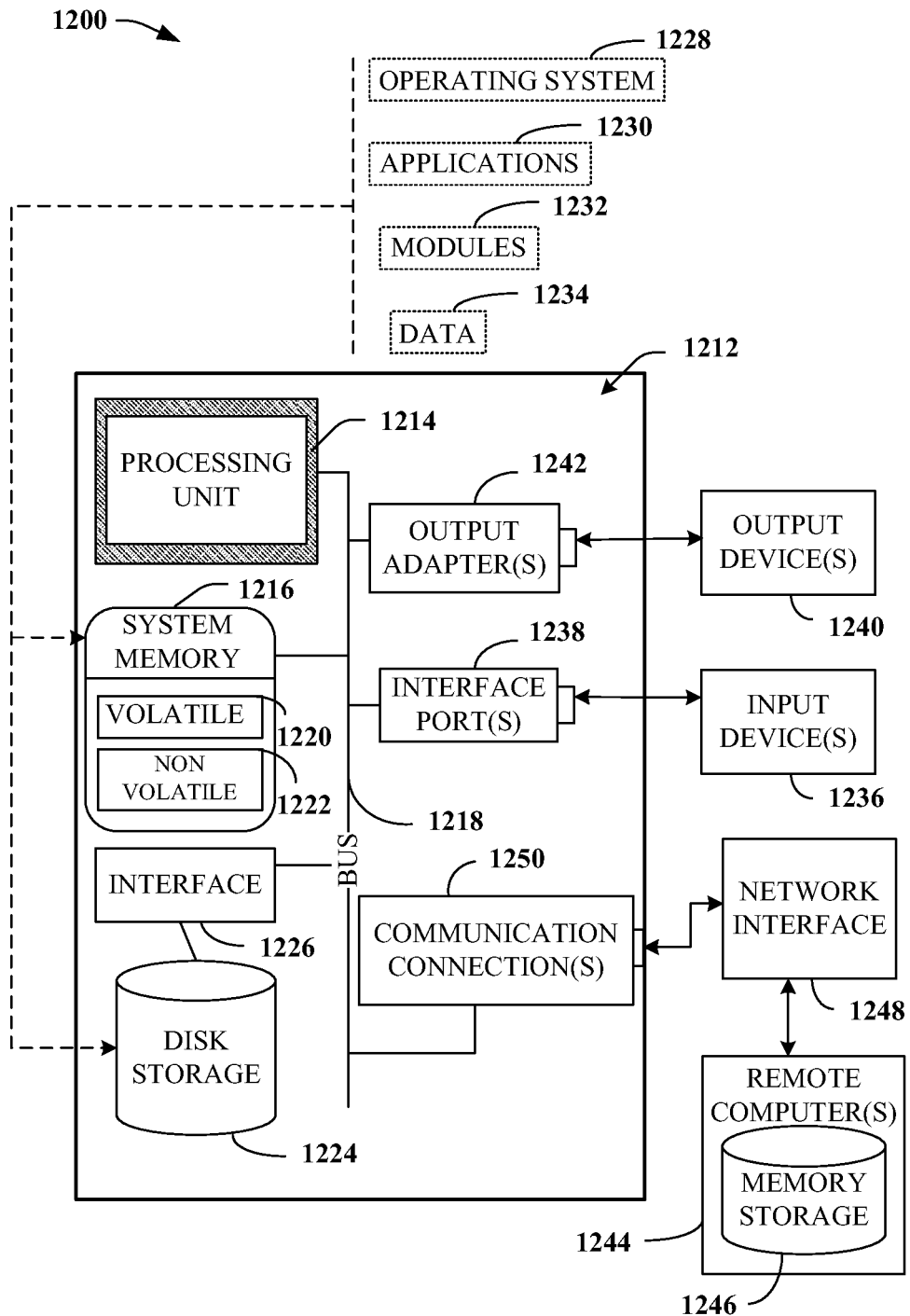
FIG. 12 is a block diagram representing an illustrative non-limiting computing system or operating environment in which one or more aspects of various embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, minicomputing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 comprises a processing unit 1214, a system memory 1216, and a system bus 1218. System bus 1218 couples system components comprising, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1216 comprises volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can comprise ROM, PROM, EPROM, EEPROM, or flash memory. Volatile memory 1220 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also comprises removable/non-removable, volatile/non-volatile computer storage media. FIG. 12 illustrates, for example, disk storage 1224. Disk storage 1224 comprises, but is not limited to, devices like a magnetic disk drive, floppy disk drive, tape drive, Jaz drive, Zip drive, LS-100 drive, flash memory card, or memory stick. In addition, disk storage 1224 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software comprises an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands, e.g., via UI component 510, or information into computer 1212 through input device(s) 1236. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 comprise, for example, a serial port, a parallel port, a game port, a universal serial bus (USB), a wireless based port, e.g., Wi-Fi, Bluetooth, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 comprise, by way of illustration and not limitation, video and sound devices, cards, etc. that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically comprises many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can comprise, for example, internal and external technologies such as modems, comprising regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    determining, by a system comprising a processor, network configuration information for facilitation of a communication between a network device and a remote device of a group of distributed remote devices;
    receiving, by the system, a device request from a requesting device specifying a requested communication protocol for the facilitation of the communication between the network device and the remote device, wherein the communication comprises command information directing the remote device to transition from a first power state to a second power state that is different than the first power state;
    in response to determining that a traffic load of a communication channel associated with the remote device satisfies a defined condition with respect to an increased loading of the communication channel, and in response to determining that the device request is a non-priority request, sending, by the system, a message directed to the requesting device to resend the device request based on a defined delay;
    in response to determining, by the system based on the network configuration information, that a network interface for the facilitation of the communication comprising the command information directing the remote device to transition from the first power state to the second power state is not compatible with the requested communication protocol, generating a revised device request specifying a communication protocol that is compatible with the network interface for the facilitation of the communication; and
    based on the revised device request, sending, by the system via the communication protocol that is compatible with the network interface, the command information directed to the remote device to facilitate the transition from the first power state to the second power state.

2. The method of claim 1, wherein the determining the network configuration information comprises:
    receiving the network configuration information via a selected device of the network devices; and
    storing the network configuration information in a storage device.

3. The method of claim 1, wherein the generating the revised device request comprises selecting a selected device of the network devices for facilitating a performance of the revised device request.

4. The method of claim 1, wherein the generating the revised device request comprises selecting a network protocol for facilitating a performance of the revised device request.

5. The method of claim 1, wherein the receiving the device request comprises receiving, via an application programming interface, the device request from an application of the requesting device.

6. The method of claim 5, wherein the device request comprises a data request directing the remote device to send data directed to the requesting device.

7. The method of claim 6, wherein the data comprises device state data representing a state of the remote device.

8. The method of claim 6, wherein the data comprises location data representing a geographical position of the remote device.

9. The method of claim 1, further comprising:
    in response to determining that the traffic load satisfies the defined condition with respect to the increased loading of the communication channel, and in response to determining that the device request is a priority request, sending, by the system, the priority request directed to the remote device.

10. A system, comprising:
a processor; and
a memory that stores executable instructions that, when executed by the processor, facilitate performance of operations, the operations comprising:
  receiving network configuration information for a facilitation of a communication between a network device coupled to a remote device of distributed remote devices;
  receiving a communication request from an application device specifying a first communication protocol for the facilitation of the communication between the network device and the remote device, wherein the communication comprises command information requesting a performance of a change of power by the remote device;
  based on a traffic load of a communication channel of the remote device being determined to be increased, and based on the communication request being determined to be a non-priority request, sending a message directed to the application device to resend the communication request at a later time;
  based on the network configuration information being determined to be incompatible with the first communication protocol, generating a revised action request specifying a second communication protocol, different than the first communication protocol, for the facilitation of the communication; and
  based on the revised action request, sending, via the second communication protocol, the communication directed to the remote device to request the performance of the change of power.

11. The system of claim 10, further comprising:
a storage device, wherein the operations further comprise storing the network configuration information in the storage device.

12. The system of claim 10, wherein the receiving of the communication request comprises receiving, via an application programming interface, the communication request via an application of the application device.

13. The system of claim 12, wherein the communication comprises an information request for the remote device to send device information directed to the application.

14. The system of claim 13, wherein the device information comprises information representing a configuration of the remote device.

15. The system of claim 13, wherein the device information comprises information representing a geographical position of the remote device.

16. The system of claim 10, wherein the request information comprises a configuration request to configure the remote device based on a defined configuration.

17. A non-transitory machine-readable storage medium, comprising executable instructions that, when executed by a processor of a mobile device, facilitate performance of operations, comprising:
  receiving network configuration information of a network device coupled to a group of distributed remote devices;
  receiving, from a requesting device, a device request comprising command information directed to a remote device of the group of distributed remote devices, wherein the device request specifies a first communication protocol for facilitation of a communication of the command information to the remote device, and wherein the command information comprises a power change request for the remote device to change a power of operation;
  based on a traffic load of a communication channel corresponding to the remote device being determined to satisfy a defined condition representing an increase of the traffic load, and based on the device request being determined to be a non-priority request, sending a message directed to the requesting device to resend the device request after a delay;
  based on the network configuration information being determined to be incompatible with the first communication protocol, generating a revised device request comprising the command information and specifying a second communication protocol for the facilitation of the communication of the command information to the remote device; and
  sending, based on the revised device request, the command information directed to the remote device via the second communication protocol.

18. The non-transitory machine-readable storage medium of claim 17, wherein the receiving of the device request comprises receiving, via an application programming interface, the device request from an application associated with the remote device.

19. The non-transitory machine-readable storage medium of claim 18, wherein the command information comprises a request for the remote device to send data directed to the application.

20. The method of claim 1, wherein the first power state corresponds to a first operating power of the remote device, and wherein the second power state corresponds to a second operating power of the remote device that is greater than the first operating power.

* * * * *